(12) United States Patent
McCoy et al.

(10) Patent No.: US 10,281,623 B2
(45) Date of Patent: May 7, 2019

(54) COLORED RETROREFLECTIVE ARTICLES

(71) Applicant: 3M INNOVATIVE PROPERTIES COMPANY, St. Paul, MN (US)

(72) Inventors: Michael A. McCoy, Minneapolis, MN (US); Shri Niwas, Maple Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/113,088

(22) PCT Filed: Jan. 27, 2015

(86) PCT No.: PCT/US2015/012992
§ 371 (c)(1),
(2) Date: Jul. 21, 2016

(87) PCT Pub. No.: WO2015/175024
PCT Pub. Date: Nov. 19, 2015

(65) Prior Publication Data
US 2016/0349416 A1   Dec. 1, 2016

Related U.S. Application Data

(60) Provisional application No. 61/934,021, filed on Jan. 31, 2014.

(51) Int. Cl.
*G02B 5/22* (2006.01)
*A41D 27/08* (2006.01)
(Continued)

(52) U.S. Cl.
CPC ........... *G02B 5/128* (2013.01); *A41D 27/085* (2013.01); *B29D 11/00615* (2013.01);
(Continued)

(58) Field of Classification Search
CPC .......... G02B 5/12; G02B 5/126; G02B 5/128; G02B 5/13; G02B 5/136; G02B 5/223;
(Continued)

(56) References Cited

U.S. PATENT DOCUMENTS 1,175,224 A   3/1916  Bleecker
2,383,884 A   8/1945  Palmquist
(Continued)

FOREIGN PATENT DOCUMENTS

CA   1004462     2/1977
CN   202929229   5/2008
(Continued)

OTHER PUBLICATIONS

Chopra, Thin Film Phenomena, 750-761, (1969).
(Continued)

*Primary Examiner* — Kimberly N. Kakalec
(74) *Attorney, Agent, or Firm* — Jeffrey M. Olofson

(57) ABSTRACT

Retroreflective articles include a layer of optical elements (110,120,130), embedded in a bead bond layer (140). The optical elements include transparent microspheres (110), at least one colored polymeric layer (120) covering the transparent microspheres, and a reflective layer (130) covering the colored polymeric layer. The polymeric layer includes at least one nanopigment. The transparent microspheres have a diameter range of 80-120 micrometers, with at least 75% of the transparent microspheres having a diameter range of 85-105 micrometers.

20 Claims, 2 Drawing Sheets

(51) Int. Cl.
*B29D 11/00* (2006.01)
*G02B 5/128* (2006.01)
*B29K 105/16* (2006.01)
*B29K 505/14* (2006.01)

(52) U.S. Cl.
CPC .......... *G02B 5/223* (2013.01); *B29K 2105/16* (2013.01); *B29K 2505/14* (2013.01); *B29K 2901/12* (2013.01); *B29K 2995/003* (2013.01)

(58) Field of Classification Search
CPC ............ B29D 11/00615; A41D 27/085; B29K 2995/003; B29K 2901/12; B29K 2505/14; B29K 2105/16
See application file for complete search history.

(56) References Cited

U.S. PATENT DOCUMENTS

| | | | |
|---|---|---|---|
| 2,461,011 A | 2/1949 | Taylor | |
| 2,543,800 A | 3/1951 | Palmquist | |
| 2,555,715 A | 6/1951 | Tatum | |
| 2,726,161 A | 12/1955 | Beck | |
| 2,842,446 A | 7/1958 | Beck | |
| 2,853,393 A | 9/1958 | Beck | |
| 2,870,030 A | 1/1959 | Stradley | |
| 2,939,797 A | 6/1960 | Rindone | |
| 2,965,921 A | 12/1960 | Bland | |
| 2,992,122 A | 7/1961 | Beck | |
| 3,468,681 A | 9/1969 | Jaupain | |
| 3,700,305 A | 10/1972 | Bingham | |
| 3,946,130 A | 3/1976 | Tung | |
| 4,102,562 A | 7/1978 | Harper | |
| 4,192,576 A | 3/1980 | Tung | |
| 4,367,919 A | 1/1983 | Tung | |
| 4,564,556 A | 1/1986 | Lange | |
| 4,758,469 A | 7/1988 | Lange | |
| 4,763,985 A | 8/1988 | Bingham | |
| 4,772,511 A | 9/1988 | Wood | |
| 4,931,414 A | 6/1990 | Wood | |
| 4,950,525 A | 8/1990 | Bailey | |
| 5,200,262 A | 4/1993 | Li | |
| 5,283,101 A | 2/1994 | Li | |
| 5,620,613 A | 4/1997 | Olsen | |
| 5,645,938 A | 7/1997 | Crandall | |
| 5,812,317 A | 9/1998 | Billingsley | |
| 5,916,300 A | 6/1999 | Kirk | |
| 5,976,669 A | 11/1999 | Fleming | |
| 5,988,821 A | 11/1999 | Tanaka | |
| 6,153,128 A | 11/2000 | Lightle | |
| 6,361,850 B1 | 3/2002 | Billingsley | |
| 6,416,856 B1 | 7/2002 | Crandall | |
| 6,677,028 B1 * | 1/2004 | Lasch | B32B 27/40 359/529 |
| 7,111,949 B2 | 9/2006 | Parisi | |
| 7,303,292 B2 | 12/2007 | Yukawa | |
| 2002/0037364 A1 | 3/2002 | Fleming | |
| 2003/0156331 A1 | 8/2003 | Oie | |
| 2006/0188700 A1 | 8/2006 | Yukawa | |
| 2011/0045176 A1 | 2/2011 | Koppes | |
| 2011/0292508 A1 | 12/2011 | Huang | |
| 2013/0108784 A1 | 5/2013 | Koppes | |

FOREIGN PATENT DOCUMENTS

| | | |
|---|---|---|
| EP | 683269 | 11/1995 |
| ES | 2061379 | 12/1994 |
| JP | H06-043819 | 2/1994 |
| WO | WO 1996-16343 | 5/1996 |
| WO | WO 1997-001776 | 1/1997 |
| WO | WO 1998-28642 | 7/1998 |

OTHER PUBLICATIONS

Nilsen, "Retroreflection Technology," Proc. of SPIE, Dec. 2004, vol. 5616, pp. 47-60.
Cleek, "Properties of Barium Titanium Silicate Glasses," Journal of Research of the National Bureau of Standards, Dec. 1956, vol. 57, No. 6, pp. 317-323.
International Search Report for PCT International Application No. PCT/US/2015/012992, dated Nov. 13, 2015, 5 pages.

* cited by examiner

COLORED RETROREFLECTIVE ARTICLES

CROSS REFERENCE TO RELATED APPLICATIONS

This application is a national stage filing under 35 U.S.C. 371 of PCT/US2015/012992, filed Jan. 27, 2015, which claims the benefit of U.S. Provisional Application No. 61/934,021, filed Jan. 31, 2014, the disclosure of which is incorporated by reference in its/their entirety herein.

FIELD OF THE DISCLOSURE

This disclosure relates to retroreflective articles, especially colored retroreflective articles and methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric bead bond layer, a reflective layer, and may also have a substrate layer. The optical lens elements commonly are microspheres that are partially embedded in the polymeric bead bond layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a bead bond layer over the coated microspheres. Often a pressure sensitive adhesive is applied on the bead bond layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

A number of retroreflective articles have been prepared and described. For example, in U.S. Pat. No. 6,153,128 (Lightle et al.), retroreflective articles are described with first and second segments, each comprising a binder layer and a multitude of microspheres embedded in the front surface of the binder layer. The first segment has an opaque reflective metal layer disposed on the embedded portions of the microspheres, whereas the second segment lacks such an opaque reflective layer and thereby allows the color of the underlying binder layer to be seen. U.S. Patent Publication No. 2011/0292508 (Huang et al.) describes an exposed lens retroreflective articles that includes a binder layer, a layer of spaced apart optical elements that are partially embedded in the binder layer, a penetrated colored layer that is located between the spaced apart optical elements, and a reflective layer that is located functionally behind the layer of optical elements and the penetrated colored layer.

SUMMARY

Described herein are colored retroreflective articles, methods of making and using them, including the use of colored retroreflective articles on articles of clothing. The retroreflective articles comprise a layer of optical elements, embedded in a bead bond layer. The optical elements comprise transparent microspheres, at least one polymeric layer covering at least the portion of the transparent microsphere embedded in the bead bond layer, and at least one reflective layer covering at least a portion of the polymeric layer covering at least the portion of the transparent microsphere embedded in the bead bond layer, wherein the polymeric layer covering at least the portion of the transparent microsphere embedded in the bead bond layer comprises a polymeric layer colored with at least one nanopigment, and wherein the transparent microspheres have a diameter range of 80-120 micrometers, with at least 75% of the transparent microspheres having a diameter range of 85-105 micrometers.

Also described herein are articles of clothing comprising a fabric with a first major surface and a second major surface, and a retroreflective appliqué attached to the first major surface of the fabric, the retroreflective appliqué comprising a retroreflective article as described above.

Methods for preparing and using retroreflective articles are also described herein. The methods comprise providing a polymeric carrier layer with a first major surface and a second major surface, providing transparent microspheres, where the transparent microspheres have a diameter range of 80-120 micrometers, with at least 75% of the transparent microspheres having a diameter range of 85-105 micrometers, partially embedding the transparent microspheres into the first major surface of the polymeric carrier layer such that the beads at least partially protrude from the first major surface of the polymeric carrier layer to form a layer of microspheres, depositing a first polymeric layer on at least a portion of the first major surface of the polymeric carrier layer and the layer of microspheres, where the first polymeric layer comprises a nanopigment, depositing a reflective layer on at least a portion of the first polymeric layer, applying a bead bond layer to the layer of microspheres, and removing the polymeric carrier layer.

BRIEF DESCRIPTION OF THE DRAWINGS

The present application may be more completely understood in consideration of the following detailed description of various embodiments of the disclosure in connection with the accompanying drawings.

Figure 1:
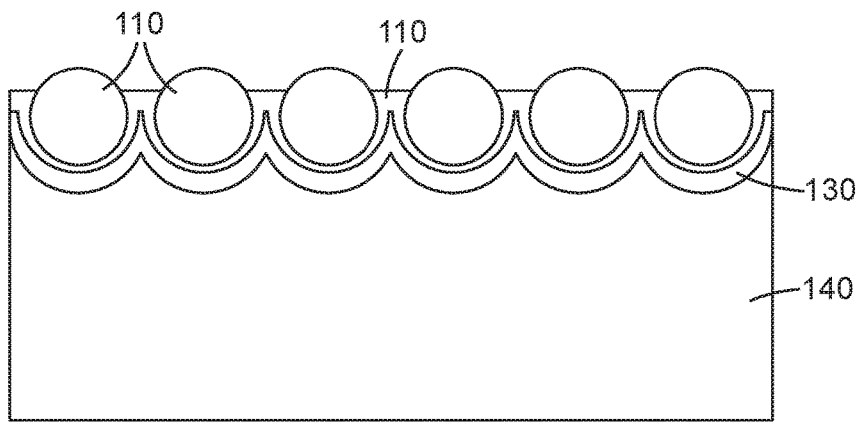
FIG. 1 shows a cross-sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desirability of making a wide variety of articles retroreflective has led to the increasing use of retroreflective articles. In some applications, an entire article may be made retroreflective; in other applications, a portion of the article may be made retroreflective through the use of one or more retroreflective appliqués. The retroreflective articles typically have an optical element layer, a polymeric bead bond layer, and a reflective layer. The optical elements commonly are microspheres that are partially embedded in the polymeric bead bond layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These retroreflective articles and appliqués can be attached to a wide range of articles, including everything from bicycles and motorized vehicles to a wide range of clothing such as jackets, vests, shirts, shoes, hats, and the like.

A variety of articles are retroreflective or have retroreflective appliqués that combine retroreflectivity with bright or fluorescent colors. Often articles have strips of retroreflective material and adjacent stripes of bright or fluorescent colors. In this way the articles provide high visibility in daylight due to the brightly colored or fluorescent strips and also are retroreflective for high visibility at night. An example is an article having two fluorescent yellow strips with a retroreflective strip located between the fluorescent yellow strips.

To even further increase the visibility it would be desirable to have retroreflective articles in which the entire article is both retroreflective and has bright and fluorescent colors for high visibility in daylight. In this way, not only does the article have high visibility in daylight due to the bright or fluorescent colors, but the article has greater night visibility due to the increased retroreflectivity. This increased retroreflectivity not only enhances safety by increasing the visibility of the wearer, it also permits the use of smaller retroreflective articles to achieve this enhanced visibility. For example, if retroreflective appliqués are used to enhance the night visibility of an article of clothing, fewer appliqués or smaller appliqués can be used.

However, making an article both entirely retroreflective as well as highly colored, is difficult to achieve because of the way that retroreflective articles are made and how retroreflectivity is achieved. Typically retroreflective articles are prepared in a multi-step process. In this process, a thermoplastic polymeric carrier layer has a plurality of transparent microspheres partially embedded in it. A reflective layer, typically a reflective metal layer such as aluminum, silver or the like, is applied to the protruding transparent microspheres. A bead bond layer is applied to the coated microsphere layer, a transfer adhesive or fabric may be adhered to the bead bond layer, and the thermoplastic polymeric carrier layer is removed to generate the retroreflective article. When the article is colored, the coloring agent, either a pigment, a dye, or a combination thereof, is placed in the bead bond layer. Because the reflective metal layer is a mirror, when viewed through the transparent microspheres the colored bead bond layer is not visible. Therefore, regions that are retroreflective do not show the color, and regions that show the color, because there is no reflective metal layer on the beads, are not retroreflective.

In this disclosure, articles are described that have the desired feature of being both highly colored and retroreflective. These retroreflective articles contain a layer of optical elements, embedded in a bead bond layer, the optical elements comprising transparent microspheres, at least one polymeric layer covering at least the portion of the transparent microsphere embedded in the bead bond layer, and at least one reflective layer covering at least a portion of the polymeric layer covering at least the portion of the transparent microsphere embedded in the bead bond layer. The polymeric layer covering at least the portion of the transparent microsphere embedded in the bead bond layer comprises a polymeric layer colored with at least one nanopigment. The microspheres have a diameter range of 80-120 micrometers, with at least 75% of the transparent microspheres having a diameter range of 85-105 micrometers. It has been determined that tight control of the diameter of the transparent microspheres, as well as tightly controlling the range of diameter sizes (that is to say that the microsphere diameters are nearly all uniform) are highly important parameters in the articles of this disclosure. In previous retroreflective articles, these parameters have not been considered particularly important. Other parameters that have been found to be important, and will be discussed in greater detail below, include the refractive index of the transparent microspheres, the thickness of the polymer covering at least the portion of the transparent microsphere embedded in the bead bond layer, and the depth which the transparent microsphere is embedded in the bead bond layer.

Articles of this disclosure have increased color because even the areas that are retroreflective are colored, and yet the retroreflectivity is not sacrificed to provide this enhanced color. As was stated above, typically the retroreflective portions of a colored retroreflective article are not colored, because if a colored layer is behind the reflective layer, the reflective layer hides the color form view. If a colored layer is placed between the reflective layer and the bead surface, it tends to interfere with the retroreflectivity of the reflective layer, and therefore only very thin and thus lightly colored layers seem suitable for use between the reflective layer and the bead surface. However, in this disclosure techniques and articles are described that are prepared in such a way that a colored layer (or multiple layers) can be placed between the bead surface and the reflective layer without sacrificing the retroreflectivity of the reflective layer. By proper selection of bead properties (such as bead size, bead size distribution, and bead refractive index) as well as the properties of the colored layer, the colored layer can be made thicker and thus give an increase in color, without sacrificing the retroreflective performance.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Unless otherwise indicated, the terms "transparent' and "optically transparent" are used interchangeably and refer to an article, film or adhesive that has a high light transmittance over at least a portion of the visible light spectrum (about 400 to about 700 nm).

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The alkylene group may also be substituted with one or more alkyl or aryl groups.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The arylene group may also be substituted with one or more alkyl or aryl groups.

The term "alkoxy" refers to a monovalent group of the formula —OR, where R is an alkyl group.

As used herein the terms "thermoplastic", "non-thermoplastic", and "thermoset", refer to properties of materials.

Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

Disclosed herein are methods of preparing retroreflective articles. These methods comprise providing a polymeric carrier layer with a first major surface and a second major surface, providing transparent microspheres, partially embedding the transparent microspheres into the first major surface of the polymeric carrier layer such that the beads at least partially protrude from the first major surface of the polymeric carrier layer to form a layer of microspheres, depositing a first polymeric layer on at least a portion of the first major surface of the polymeric carrier layer and the layer of microspheres, depositing a reflective layer on at least a portion of the first polymeric layer, applying a bead bond layer to the layer of microspheres, and removing the polymeric carrier layer. As will be described below, the transparent microspheres have a diameter range of 80-120 micrometers, with at least 75% of the transparent microspheres having a diameter range of 85-105 micrometers. The first polymeric layer comprises at least one polymer and at least one nanopigment. In some embodiments, the nanopigment comprises a fluorescent nanopigment. The bead bond layer may include a colorant, such as a dye, a pigment, or a combination thereof.

A wide variety of materials are suitable for use in the methods described above. Examples of these materials are described below.

A wide variety of materials and combinations of materials are suitable for the polymeric carrier layer. In many embodiments the polymeric carrier layer is a thermoplastic polymeric carrier layer, but in other embodiments the polymeric carrier layer may comprise an elastomeric polymeric carrier layer, and in some embodiments may even be a pressure sensitive adhesive or a heat activated adhesive. Typically the polymeric carrier layer comprises a thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

A layer of partially embedded transparent microspheres is formed on the surface of the polymeric carrier layer. The monolayer of transparent microspheres is assembled by cascading transparent microspheres onto polymeric carrier layer, which secures the microspheres in a desired temporary assignment. Typically, the polymeric carrier layer is heat softened. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the polymeric carrier layer retains the microspheres in a desired arrangement.

Typically, the transparent microspheres are substantially spherical in shape in order to provide the most uniform and efficient retroreflection. The microspheres are substantially transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins.

Examples of microspheres that may be used are described in the following U.S. Pat. Nos. 1,175,224, 2,461,011, 2,726, 161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

As described above, unlike previous retroreflective articles where microspheres with a wide range of diameters and microsphere collections with a wide range of diameter sizes were suitable, in the present disclosure it is desirable that the diameter range of the microspheres be tightly selected, and also it is desirable to tightly controlling the range of diameter sizes (that is to say that the microsphere diameters are nearly all uniform). In this disclosure, the average diameter is in the range of about 80-120 micrometers, with at least 75% of the transparent microspheres having a diameter range of 85-105 micrometers. The microspheres typically have a refractive index of about 1.5 to about 2.0.

The polymeric layer that is deposited on the transparent microspheres is a colored polymer layer, meaning that is comprises not only at least one polymer, but also a nanopigment. In addition, the polymeric layer may comprise additional coloring agents such as dyes, pigments, or a combination thereof.

The polymeric layer may be a single layer or a multi-layer construction. When the polymeric layer is a multi-layer construction, at least one layer is colored with a nanopigment. Additional layers may also be colored, but it is not necessary that all layers be colored. In some embodiments, at least one of the layers of the multi-layer construction comprises a polymeric layer comprising at least one additive selected from UV stabilizers, antioxidants, UV absorbers, property modifiers, performance enhancers, or combinations thereof. It is desirable that this layer, which contains stabilizing additives, is located between the pigmented layer and the environment, such that it protects the pigmented layer from UV degradation, degradation due to laundering, and the like. Thus the polymeric layer comprising at least one additive selected from UV stabilizers, antioxidants, UV absorbers, property modifiers, performance enhancers, or combinations thereof is located between the surface of the transparent microsphere and a polymeric layer colored with at least one nanopigment. In addition the multi-layer polymeric construction may contain additional layers, either colored or transparent and optionally containing one or more of the additives described above.

In other embodiments containing a multi-layer polymer construction, the multi-layer polymer construction may comprise a clear polymeric layer. By clear polymeric layer, it is meant a polymeric layer that is optically transparent or optically clear. This polymeric layer, like the polymeric layer containing additives described above, is generally located between the pigmented layer and the environment, such that it protects the pigmented layer from degradation from exposure to the environment. Thus the clear polymeric layer is located between the surface of the transparent microsphere and a polymeric layer colored with at least one nanopigment. In addition, the multi-layer polymeric construction may contain additional layers, either colored or transparent and optionally containing one or more of the additives described above.

The polymer layer includes a nanopigment. A pigment can be any material that is capable of changing the color of reflected or transmitted light as the result of wavelength-selective adsorption. Any colored pigment can be utilized in retroreflective articles as disclosed herein. In embodiments, the pigment can be a nanopigment. A nanopigment is a pigment that generally has an average particle size in the nanometer range. In embodiments, a nanopigment can have an average particle size from about 1 nm to about 1000 nm. Nanopigments can be useful because of the interaction of light with them; light will diffract from nanopigments because of their size, which can contribute to high reflectivities. In embodiments, a nanopigment can have an average particle size from about 50 nm to about 500 nm. An exemplary nanopigment that can be utilized includes CABOJET 300, which is commercially available from Cabot Corporation (Boston, Mass.).

In some embodiments, the colored layer can include both nanopigments and other sized pigments (which can be referred to herein as "normal pigments"). Normal pigments can generally have average particle sizes from about 1 micrometer to about 40 micrometers. In embodiments, normal pigments can have average particle sizes from about 1 micrometer (1000 nm) to about 10 micrometers. In embodiments that include both nanopigments and normal pigments, the nanopigments can account for at least about 5 percent of the total pigment by weight. In embodiments that include both nanopigments and normal pigments, the nanopigments can account for at least about 10 percent of the total pigment by weight. In some embodiments, the colored layer includes both pigments and dyes, such as both nanopigments and dyes for example.

The colored layer generally includes a desirable amount of pigment to provide a desired color or depth of color of the colored layer or article. The amount of pigment in the colored layer can depend at least in part on the particular pigment(s) utilized, the desired color or shade of color, the other components in the colored layer, and combinations thereof. In embodiments, the colored layer can have 0.1 to 70 percent pigment, by weight of solids in the colored layer; from 1 to 40 percent pigment, by weight of solids in the colored layer; or from 5 to 35 percent pigment, by weight of solids in the colored layer.

As mentioned above, the polymer layer, in addition to the nanopigment, may also contain other colorants such as dyes, pigments or a combinations of dyes and pigments. Examples of suitable dyes and pigments include those included in the following table:

| Color Index Name | Color Index Number | Company Order Number | Company |
| --- | --- | --- | --- |
| Yellow 16 | 12,700 | SUDAN YELLOW 146 | BASF, Clifton NJ |
| Yellow 56 | 11,021 | SUDAN YELLOW 150 | BASF, Clifton NJ |
| Red 1 | 12,150 | SUDAN RED 290 | BASF, Clifton NJ |
| Blue 35 | 61,554 | SUDAN BLUE 35 | BASF, Clifton NJ |
| Pigment Yellow 83 | 21,108 | 275-0570 | Sun Chemical, Cincinnati, OH |
| Pigment Yellow 17 | 21,105 | 275-0023 | Sun Chemical, Cincinnati, OH |

In some embodiments, the colorant is a highly visible fluorescent dye and/or pigment. Fluorescent dyes and/or pigments can provide enhanced conspicuity under daytime lighting conditions. Examples of fluorescent dyes or pigments that may be used to color the bead bond layer, include: DAY-GLO FIRE ORANGE T-14, ROCKET RED GT, BLAZE ORANGE GT, and SATURN YELLOW T-17, from Day-Glo Color Corp., Cleveland, Ohio; FLARE 911 from Cleveland Pigment & Color Co., Akron, Ohio; LUMOGEN F RED 300, F YELLOW 083, and YELLOW S0790 (PIGMENT YELLOW 101, C.I. No. 48052), BASF Corporation, Clifton, N.J.

A wide variety of polymers are suitable for use in the nanopigmented polymeric layer of this disclosure. Generally, polymeric materials such as those described below for the bead bond layer can be utilized. Specific exemplary polyurethane forming methods (into which pigments can be incorporated) are described in U.S. Pat. Nos. 5,645,938 and 6,416,856 (Crandall) and PCT Publication No. WO 96/16343, and in U.S. Pat. No. 5,976,669 (Fleming), and PCT Publication No. WO 98/28642. In some embodiments, polyester polyurethanes, polyether polyurethanes, or polyurethanes that include a block copolymer of polyether and polyester units can be utilized. A class of commercially available polyurethane materials that can be utilized are BAYHYDROL polyurethane dispersions that are available from Bayer AG (Leverkusen, Germany).

The reflective layer may comprise a reflective metal layer or a dielectric reflective layer. The reflective metal layer is a specularly reflective metal that forms a reflective metal layer coating. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

The reflective material can be a layer comprising an elemental metal that is capable of specularly reflecting light. A variety of metals may be used to provide a specular reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. In some embodiments, silver metal is particularly desirable. The metal layer should be thick enough to reflect incoming light. Typically, the reflective metal layer is about 50 to 150 nanometers thick.

When the reflective layer is a dielectric reflective layer, the dielectric reflective layer is a dielectric mirror. The dielectric mirror may be similar to known dielectric mirrors disclosed in U.S. Pat. Nos. 3,700,305 and 4,763,985 to Bingham. The dielectric mirrors typically are multi-layer constructions, with a layer having a refractive index $n_2$ and a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, more typically at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_1 > n_1 < n_3$ or $n_2 < n_1 > n_3$, and the materials on either side of the transparent layer may be either both higher or both lower in refractive index than $n_1$. When $n_1$ is higher than both $n_2$ and $n_3$, $n_1$ is in the 1.7 to 4.9 range, and $n_2$ and $n_3$ are in the 1.2 to 1.7 range. Conversely, when $n_1$ is lower than both $n_2$ and $n_3$, $n_1$ is in the 1.2 to 1.7 range, and $n_2$ and $n_3$ are in the 1.7 to 4.9 range. The dielectric mirror generally comprises a contiguous array of materials, at least one being in layer form, having an alternating sequence of refractive indices. Typically, the contiguous array has from two to seven layers, more typically three to five layers, adjacent to the lens element. A dielectric mirror can provide very good retroreflectivity, although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, $Na_3AlF_6$, $ThOF_2$, elastomeric copolymers of perfluoropropylene and vinylidene fluoride (refractive index of >>1.38), etc. Other materials are reported in Thin Film Phenomena, K. L. Chopra, page 750, McGraw-Hill Book Company, N.Y., (1969). Particularly suitable dielectric mirrors contain layers of $SiO_2$, $CaF_2$, $MgF_2$, ZnS, $Nb_2O_5$, $Ta_2O_5$, or combinations thereof. In some embodiments, the dielectric reflective layer comprises a layer of $CaF_2$, ZnS, or a combination thereof.

The bead bond layer contains at least one polymer (typically called a binder material) and may contain additional additives such as a colorant or other optional additives such as UV stabilizers, antioxidants, UV absorbers, property modifiers, performance enhancers, or combinations thereof. Any of the colorants described above (nanopigments, dyes, and pigments) are suitable for use in the bead bond layer.

The polymeric binder material of the bead bond layer may be a polymer including, but not limited to, an elastomer. In this disclosure, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Typically, the polymeric binder material includes a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed as the binder material in the bead bond layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful bead bond layer materials are disclosed in U.S. Pat. Nos. 5,200,262 and 5,283,101. In the '262 patent, the bead bond layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the bead bond layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially-available polymers that may be used in the bead bond layer include the following: VITEL VPE 5545 and VPE 5833 polyesters available from Bostik, Wauwatosa, Wis.; RHOPLEX HA-8 and NW-1845 acrylic resins available from Dow Chemical; CYDROTHANE a polyurethane available from Cytec Industries, West Patterson, N.J.; ESTANE 5703 and 5715 available from Lubrizol Corporation, Cleveland, Ohio; and NIPOL 1000, available from Zeon Chemicals, Inc., Rolling Meadows, Ill.

The bond layer typically has a thickness of about 50 to 250 micrometers (2 to 10 mils), with thicknesses of about 75 to 200 micrometers (3 to 8 mils) often being particularly suitable. It is to be understood that a bead bond layer having a thickness outside these ranges may be used; however, if the bead bond layer is too thin, it may not provide sufficient support to the microspheres, allowing them to become dislodged.

If colored, the bead bond layer generally includes a desirable amount of pigment to provide a desired color or depth of color of the colored layer or article. The amount of pigment in the colored layer can depend at least in part on the particular pigment(s) utilized, the desired color or shade of color, the other components in the colored layer, and combinations thereof. In embodiments, the colored bead bond layer can have 0.1 to 70 percent pigment, by weight of solids in the colored layer; from 1 to 40 percent pigment, by weight of solids in the colored layer; or from 5 to 35 percent pigment, by weight of solids in the colored layer.

The above methods can be used to prepare a wide variety of retroreflective articles. In this disclosure, articles are described that have the desired feature of being both highly colored and retroreflective. These retroreflective articles contain a layer of optical elements, embedded in a bead bond layer, the optical elements comprising transparent microspheres, at least one polymeric layer covering at least the portion of the transparent microsphere embedded in the bead bond layer, and at least one reflective layer covering at least a portion of the polymeric layer covering at least the portion of the transparent microsphere embedded in the bead bond layer. The polymeric layer covering at least the portion of the transparent microsphere embedded in the bead bond layer comprises a polymeric layer colored with at least one nanopigment. The microspheres have a diameter range of 80-120 micrometers, with at least 75% of the transparent microspheres having a diameter range of 85-105 micrometers. It has been determined that tight control of the diameter of the transparent microspheres, as well as tightly controlling the range of diameter sizes (that is to say that the microsphere diameters are nearly all uniform) are highly important parameters in the articles of this disclosure. In previous retroreflective articles, these parameters have not been considered particularly important.

Figure 3:
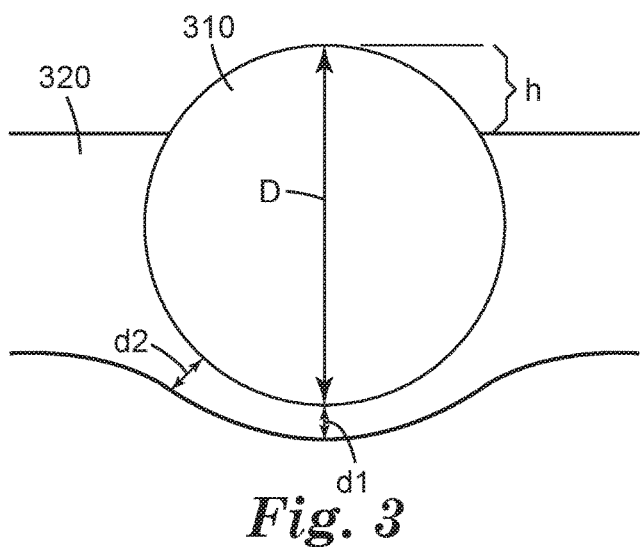
FIG. 3 shows a cross-sectional view of single retroreflective bead of an article of this disclosure.

In addition to the diameter of the transparent microspheres, it has been determined that the refractive index of the transparent microspheres is also an important parameter. Typically the transparent microspheres have a refractive index in the range of 1.5 to 2.0. In some embodiments, the transparent microspheres have a refractive index in the range of 1.80-1.95. The refractive index of the transparent microspheres is chosen to take into account the effect of the colored polymer layer that lies between the transparent microsphere and the reflective layer, because the mismatch of refractive indices causes light refraction at the interface between the transparent microsphere and the polymer layer. The presence of a polymeric colored layer between the transparent microsphere and reflective layer causes an additional refraction due to the refractive index mismatch between the bead and colored layer. As the thickness of this colored layer increases, the change in the light path due to this refraction increases, and may cause an unwanted change in divergence angle, and therefore a decrease in retroreflective efficiency in the desired range of divergence angles (described in retroreflective nomenclature as observation angle, that is, the angle between the light path incident onto the retroreflective article and the returned retroreflective light path). FIG. 3 illustrates these elements. FIG. 3 is a schematic showing the geometry of a polymeric colored layer that has been coated over the transparent microsphere layer and dried and/or cured. Depending on the nature of the polymer chemistry, coating formulation, and drying/curing conditions, the thickness of the polymeric colored layer can vary across the surface of the transparent microsphere, indicated, for example by thicknesses d1 and d2 of FIG. 3. This thickness variation can lead to a variable interaction with the optical path, and lead to changes in divergence angle of retroreflected light as a function of entrance angle. By modifying the bead refractive index, or by designing a range of bead refractive indices, one can tailor retroreflective efficiencies over a range of observation and entrance angles.

In the present disclosure, the deleterious effect of the colored layer on retroreflectivity is dramatically reduced by using a tailored approach for the bead size distribution and using a bead refractive index that is less than typically employed for exposed bead retroreflective articles. The combination of these parameters can allow a significantly thicker polymeric colored layer, and therefore a significantly higher color luminance, without undesirably degrading the retroreflective performance.

As described above, another important parameter is the thickness of the polymer layer covering at least the portion of the transparent microsphere embedded in the bead bond layer. This polymer is the polymeric layer that contains a nanopigment and may be a multi-layer construction or a single layer. U.S. Patent Publication No. 2011/0292508, (Huang et al.) discloses a method for making colored retroreflective articles by depositing a colored composition on to the exposed surface of optical elements that are partially embedded into a carrier layer, then depositing a reflective layer. The colored composition is designed such that during the drying of the colored composition, less of the colored composition remains on top of the optical elements, instead flowing down the exposed surfaces of the optical elements and filling the volume between the optical elements and the carrier web in which they are embedded. The advantage of this method is that the colored composition that remains on the top surfaces of the optical elements can interfere somewhat with the effect of the reflective layer that is next coated on the optical elements, and thus decrease the retroreflectivity of the article. The color luminance (Y) in fluorescent colored retroreflective articles was found to be surprisingly sensitive to the thickness of colored layer between the optical elements. For example, changing the thickness of the colored layer by changing the amount that the transparent microspheres are embedded into the carrier layer by six micrometers (from a sink depth from 19 to 25 micrometers) can cause a change in luminance of a fluorescent yellow colored reflective article from 61 to 92. However, increasing the thickness of the colored composition between the beads can have, and typically does have, the undesirable effect of decreasing retroreflectivity. This can be particularly deleterious for applications such as high visibility safety garments which require high retroreflectivity and proscribe minimum retroreflectivity coefficients at a wide range of entrance angles (see, for example, high visibility clothing test method and requirements standards such as ANSI/ISEA 107/2010 or ISO 20471:2013). Typical retroreflective applications use a wide range of bead diameter. However, in the application for a colored reflective article made using a colored layer applied to the exposed surfaces of the optical elements, differences in bead diameter caused smaller beads to have a larger thickness of colored layer between the optical element and the reflective layer, thus resulting in a dramatic decrease in retroreflective efficiency. As will be shown in the examples, decreasing the variation of the diameter of the embedded optical elements has a significant and unanticipated improvement in color luminance while preserving the retroreflective efficiency.

Figure 4:
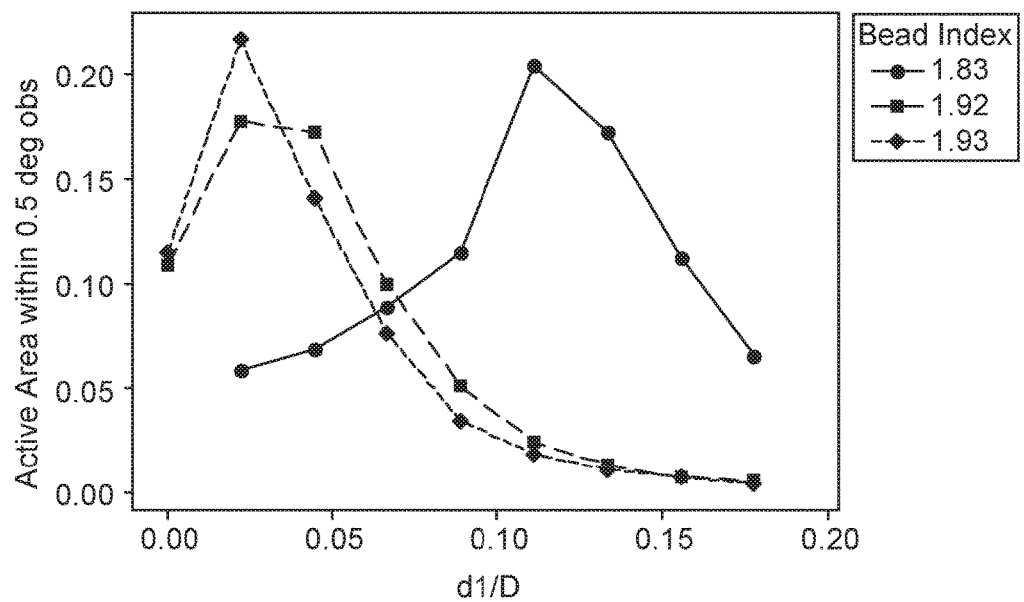
FIG. 4 is a plot showing the effect of bead refractive index and the ratio of colored layer thickness (thickness between bead and reflective layer) to bead diameter on the retoreflective efficiency of the bead for a maximum divergence angle of 0.5 degrees.
Figure 5:
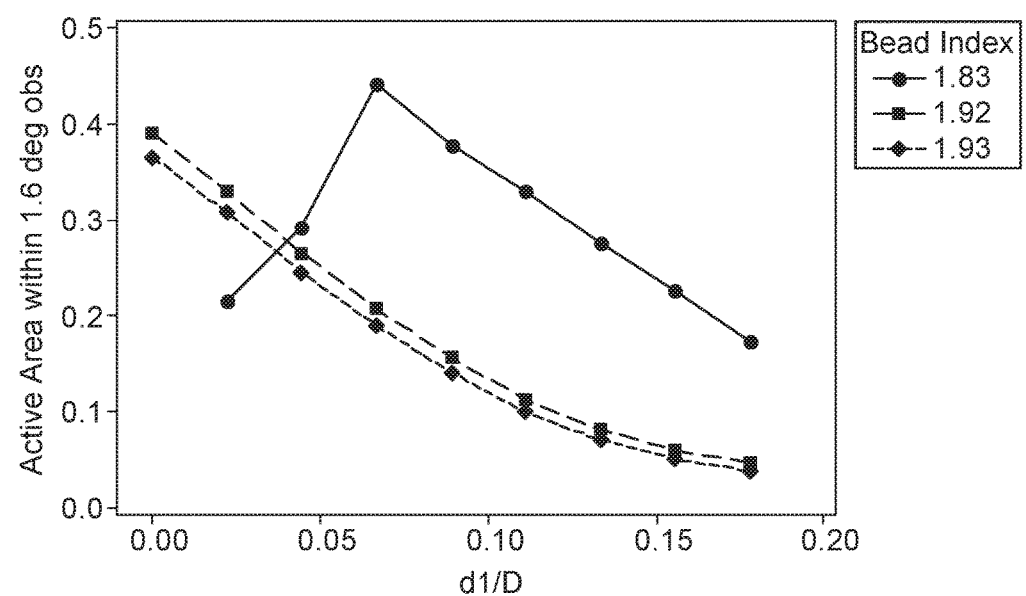
FIG. 5 is a plot showing the effect of bead refractive index and the ratio of colored layer thickness (thickness between bead and reflective layer) to bead diameter on the retoreflective efficiency of the bead for a maximum divergence angle of 1.6 degrees.

The ability to prepare articles which have colored layers between the microbead surface and the reflective surface that have a greater thickness is achievable without sacrificing retroreflective efficiency is demonstrated in the data shown in FIGS. 4 and 5, which are discussed in more detail in the Examples section. These Figures show the effect on retroreflective efficiency as a function of colored polymer layer thickness/bead diameter for different bead refractive indices for beam divergence (observation angle) ranges of 0.5 and 1.6 degrees. The typical optimal bead index for air interface in what are commonly referred to as exposed bead structures, as taught, for example, in U.S. Pat. No. 3,700,305 (Bingham) is approximately 1.93, and it was unexpected that at a change in the refractive index would cause a dramatic shift in the optimal thickness of the colored polymer layer and provide an opportunity for increasing the amount of colorant between and behind the transparent microspheres without degrading the retroreflective efficiency.

Yet another parameter that is important in the retroreflective articles of this disclosure is the depth which the transparent microsphere is embedded in the bead bond layer. Typically, this parameter is expressed as the surface area of the transparent microsphere that is exposed, i.e. sticking out of the bead bond layer. In articles of this disclosure, typically less than 50% of the surface area of the transparent microsphere is exposed.

In some embodiments, it is desirable that the retroreflective articles have at least a portion of the surface of the article be discontinuous. By discontinuous it is meant that there is a region in the surface of the article that is devoid of microspheres and bead bond layer. These discontinuities can be beneficial for a variety of reasons. In some embodiments, the discontinuities can form a pattern or design. The pattern or design can be in the form of indicia, logos, etc. In other embodiments, the discontinuities can be arranged either randomly or in a non-continuous pattern. Besides the visual effect of the discontinuities, the discontinuities can provide enhanced breathability for the retroreflective article. By this it is meant that gases, and or moisture can pass through the retroreflective article more easily. An effect of the enhanced breathability is to be more comfortable for a person wearing such an article. This is particularly desirable for construction workers, firefighters, emergency workers, and people exercising.

Retroreflective articles with discontinuous segments can be prepared a variety of different ways. A particularly suitable way involves partially removing optical elements and bead bond layer from portions of one or more segments. This removal can be effected by cutting, scraping, hole-punching, and other suitable mechanical means.

Examples of articles of this disclosure are provided in the Figures. FIG. 1 is a cross sectional depiction of an embodiment of this disclosure. In FIG. 1, the retroreflective articles contains transparent microspheres 110, polymer layer 120 which contains a nanopigment, reflective layer 130, and bead bond layer 140.

Figure 2:
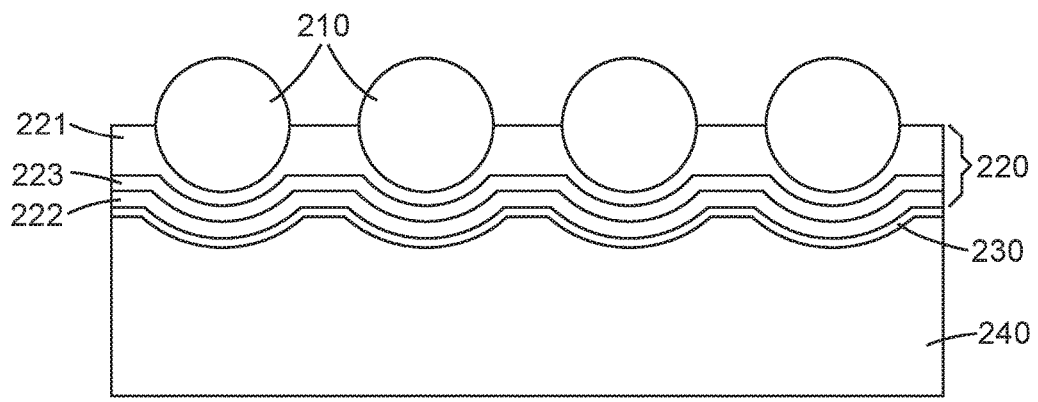
FIG. 2 shows a cross-sectional view of an embodiment of an article of this disclosure.

FIG. 2 depicts an alternative embodiment of the article of FIG. 1. In FIG. 2, the polymer layer containing a nanopigment 220 is a multi-layer construction comprising three sublayers 221, 222, and 223. In some embodiments, sublayer 223 contains the nanopigment and sublayer 221 contains at least one additive selected from UV stabilizers, antioxidants, UV absorbers, property modifiers, performance enhancers, or combinations thereof. In other embodiments, sublayer 223 contains the nanopigment and sublayer 221 is a clear polymeric layer. Sublayer 222 may be clear or colored. The article also includes transparent microspheres 210, reflective layer 230, and bead bond layer 240.

FIG. 3 depicts a single transparent microsphere 310 surrounded by a polymer layer 320. This Figure is used to describe the diameter of the transparent microspheres (designated D) the area of the transparent microsphere that is exposed (designated h) and the thickness of the polymer at different locations of the surface of the transparent microsphere (designated as d1 and d2). In articles of this disclosure it is desired that d1 be minimized, typically in the range of of 2 to 4 micrometers for a transparent microsphere refractive index of 1.93. We disclose that this thickness range can be substantially increased by adjusting the transparent microsphere refractive index lower. FIG. 4 shows the effect of the transparent microsphere refractive index on the retroreflective efficiency of the transparent microsphere as a function of colored polymer layer/transparent microsphere diameter for a desired beam divergence angle (described in retroreflective measurement as observation angle) of 0.5 degrees. FIG. 5 shows the effect of the transparent microsphere refractive index on the retroreflective efficiency of the transparent microsphere as a function of colored polymer layer/transparent microsphere diameter for a desired beam divergence angle (described in retroreflective measurement as observation angle) of 1.6 degrees.

Also disclosed herein are articles of clothing that contain retroreflective appliqués. These articles of clothing comprise a fabric with a first major surface and a second major surface, and a retroreflective appliqué attached to the first major surface of the fabric. The retroreflective appliqué is the retroreflective article described above. A wide variety of fabrics are suitable.

The retroreflective appliqué can be attached to the fabric surface by a wide range of attachment techniques such as mechanical attachment or adhesive attachment. Examples of mechanical attachment techniques include, for example, sewing and heat lamination. In adhesive attachment, an adhesive can be applied to the bead bond layer or a backing layer can be applied to the bead bond layer and an adhesive layer applied to the backing layer.

Examples of suitable adhesive layers include pressure sensitive adhesives, heat activated adhesives, and laminating adhesives. The adhesive layer may be applied to the bead bond layer or backing layer by coating or by lamination of a formed adhesive layer to the bead bond layer or backing layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

A wide variety of articles of clothing are suitable for attachment of retroreflective appliqués. Examples of such articles of clothing include, for example, vests such as the safety vests frequently worn by road construction workers, but also include a wide range of other clothing types. Examples include, shirts, sweaters, jackets, coats, pants, shorts, socks, shoes, gloves, belts, hats, suits, one-piece body garments, and the like.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: cd=candelas; m=meters; mm=millimeters; psi=pounds per square inch; kPa=kiloPascals.

Table of Abbreviations

| Abbreviation or Trade Designation | Description |
|---|---|
| Pigment 1 | JCF10A fluorescent yellow pigment dispersion, commercially available from J COLOR Chemicals Corp., Hangzhou City, China. |
| Resin 1 | DESMOPHEN 670BA hydroxyl-bearing polyester, commercially available from Bayer, Pittsburgh, PA. |
| Resin 2 | DESMODUR NZ1 isocyanate resin, commercially available from Bayer, Pittsburgh, PA. |
| Crosslinker 1 | NEOCRYL CX100 azopyridine emulsion, commercially available from DSM NeoResins, Inc., Wilmington, MA. |
| Silane 1 | DYNASYLAN 1122 silane commercially available from Evonik Industries, Mobile, AL. |
| Catalyst 1 | BICAT 8108 catalyst, commercially available from The Shepherd Chemical Company, Cincinnati, OH. |
| Catalyst 2 | Dibutyl tin dilaurate catalyst, commercially available from Air Products Company, Allentown, PA as DABCO T-12. |
| Pigment 2 | GT17 Dayglo Saturn Yellow fluorescent yellow pigment commercially available from Day-Glo Color Corp., Cleveland, OH. |
| MIBK | Methyl isobutyl ketone |
| MEK | Methyl ethyl ketone |
| Resin 3 | VITEL 3550B, copolyester resin commercially available from Bostick, Wauwatosa, WI. |
| Resin 4 | VITEL 5833, copolyester resin commercially available from Bostick, Wauwatosa, WI. |
| Silane 2 | SILQUEST A-1310 silane, commercially available from Momentive, Albany, NY. |
| Resin 5 | DESMODUR L-75, commercially available from Bayer, Pittsburgh, PA. |
| Fabric 1 | NOMEX 450 aramid fabric, commercially available from Dupont Corporation. |
| Adhesive 1 | A polyurethane adhesive compostion. |

Test Methods
Retroreflectivity Measurement

The coefficient of retroreflectivity ($R_A$) is described in U.S. Pat. No. 3,700,305 (Bingham):

$$R=E_r^* d^2/E_s^* A$$

R=retroreflective intensity
$E_r$=illumination incident upon the receiver
$E_s$=illumination incident upon a plane perpendicular to the incident ray of the specimen position, measured in the same units as $E_r$
d=distance from the specimen to the projector
A=area of the test surface The retroreflectivity measurement test procedure used follows the test criteria described in ASTM E810-03 (2013)—Standard Test Method for Coefficient of Retroreflective Sheeting using the Coplanar Geometry. Retroreflective units are reported in cd/lux/m². High visibility safety apparel standards such as ANSI/ISEA 107-2010 and ISO 20471:2013 require minimum $R_A$ performance at specific combinations of entrance and observation angle. Entrance angle is defined as the angle between the illumination axis and the retroreflector axis. The observation angle is defined as the angle between the illumination axis and the observation axis.

Color Measurement

The color of a retroreflective article can be described in terms of a luminance-chromaticity color space (Yxy), where Y is the color luminance, and x and y are chromaticity coordinates. These values are related to the CIE XYZ color space (International Commission on Illumination (CIE 1931)):

$$x=X/(X+Y+Z)$$

$$y=Y/(X+Y+Z)$$

The advantage of using Yxy color space is that the chromaticity can be plotted on a chart, usually called the CIE x-y chromaticity diagram. This color representation/nomenclature is used in high visibility safety apparel regulatory standards such as ANSI/ISEA 107-2010 and ISO 20471:2013. The color measurement procedure is in accordance with the procedure outlined in ASTM E 308-90, where the following operating parameters are as set forth below:

Standard illuminant: D65 daylight illuminant
Standard observer: CIE (International Commissioner of Illumination) 1931 2°
Wavelength interval: 400-700 nanometers at 10 nanometer intervals
Incident light: 0° on sample plane
Viewing: 45° through a ring of 16 fiber optic receptor stations
Area of view: one inch
Port size: one inch Knowing these parameters, a person of ordinary skill can reproduce this test. For a further discussion of the operating parameters see ASTM E 1164-93.

Preparation of Retroreflective Film Samples (General Procedure)

Step 1: Embedding Transparent Microspheres in Carrier Web

Transparent microspheres of specific size distributions were prepared using a series of 200 mm diameter sieves (H&C Sieving Systems, Columbia, Md.) and sieved using a sieve shaker (Retsch AS 200 vibratory sieve shaker, Newtown, Pa.). The size distribution was characterized using a LS 13320 particle size analyzer (Beckman Coulter, Brea, Calif.).

In each of the Examples and Comparative Examples, the glass microspheres were partially and temporarily embedded in a carrier sheet. The carrier sheet included paper juxtaposed against a polyethylene layer that was about 25 to 50 micrometers thick. The carrier sheet was heated in a convection oven to 120° F. (104° C.), then the microspheres were poured onto the sheet and left for 60 seconds. The sheet was removed from the oven and allowed to cool to room temperature. Excess beads were poured off the sheet, and the sheet was then placed in an oven at 320° F. (160° C.) for 60 seconds. The sheet was removed from the oven and allowed to cool. The microspheres were partially embedded in the polyethylene layer such that more than 50 percent of the microspheres protruded. The depth was measured using cross-section analysis using a scanning electron microscope (JEOL, Tokyo, Japan).

Step 2: Coating Processes

Coating Suspension 1 was prepared according to the components described in Table A below and coated onto the microspheres protruding from the carrier. Coating Suspension 1 was coated onto the microspheres using a lab hand-spread notch-bar coater gapped at 50 micrometers (2 mils) The sample was dried for 3 minutes at 150° F. (65° C.) and for an additional 2 minutes at 194° F. (90° C.).

TABLE A

| Coating Suspension 1 | |
|---|---|
| Component | Parts by Weight |
| Pigment 1 | 20.44 |
| Resin 1 | 4.18 |
| Resin 2 | 3.18 |

TABLE A-continued

Coating Suspension 1

| Component | Parts by Weight |
| --- | --- |
| Crosslinker 1 | 1.43 |
| Silane 1 | 0.68 |
| Catalyst 1 | 0.008 |
| Toluene | 35.04 |
| Ethyl Acetate | 35.04 |

After the first coating was dried, Coating Suspension 2 was prepared according to the components described in Table B below and coated onto the previous coated layer. Coating Suspension 2 was coated using a lab handspread notch-bar coater gapped at 38 micrometers (1.5 mils) The sample was dried for 3 minutes at 150° F. (65° C.) and for an additional 2 minutes at 194° F. (90° C.).

TABLE B

Coating Suspension 2

| Component | Parts by Weight |
| --- | --- |
| Resin 1 | 6.50 |
| Resin 2 | 4.90 |
| Crosslinker 1 | 2.20 |
| Silane 1 | 0.99 |
| Catalyst 1 | 0.005 |
| Ethyl Acetate | 85.39 |

Following drying, the coated samples were coated with a 150 nanometer thick silver layer to form the metal reflective layer. A sputtering system using a DC magnetron was used to apply the silver metal.

Binder Suspension 1 was prepared according to the components described in Table C below and coated onto the silver coated samples. This solution was coated onto the silver layer using a lab handspread notch-bar coater gapped at 38 micrometers (1.5 mils) The sample was dried for 30 seconds at 160° F. (65.5° C.) and for an additional 3 minutes at 180° F. (82° C.)

TABLE C

Binder Suspension 1

| Component | Parts by Weight |
| --- | --- |
| Resin 3 | 73.28 |
| Resin 4 | 3.61 |
| Pigment 2 | 9.02 |
| Resin 5 | 3.60 |
| Silane 2 | 1.35 |
| MIBK | 9.02 |
| Catalyst 2 | 0.13 |

The Binder coated samples were laminated onto Fabric 1 using Adhesive 1 at a pressure of 70 psi (483 kPa) at 220° F. (104° C.).

Descriptions of Specific Examples

Comparative Example C1

A retroreflective film sample was prepared using the general procedure described above. The transparent microspheres in the form of glass beads with refractive index 1.93 had the standard size distribution shown in Table D below. The descriptor nomenclature D5, D25, D50, D75, and D95 means that the diameter with the bead size distribution containing 5, 25, 50, 75 and 95% of the bead diameter within the sample is less than or equal that value.

TABLE D

Microsphere Size Distribution for C1

| Descriptor | Size (micrometers) |
| --- | --- |
| D5 | 48 |
| D25 | 57 |
| D50 | 65 |
| D75 | 72 |
| D95 | 84 |

Comparative Example C2

A retroreflective film sample was prepared using the general procedure described above. The transparent microspheres in the form of glass beads with refractive index 1.93 had the standard size distribution shown in Table E below. The descriptor nomenclature D5, D25, D50, D75, and D95 means that the diameter with the bead size distribution containing 5, 25, 50, 75 and 95% of the bead diameter within the sample is less than or equal that value.

TABLE E

Microsphere Size Distribution for C1

| Descriptor | Size (micrometers) |
| --- | --- |
| D5 | 66 |
| D25 | 73 |
| D50 | 81 |
| D75 | 90 |
| D95 | 103 |

Example 1

A retroreflective film sample was prepared using the general procedure described above. The transparent microspheres in the form of glass beads with refractive index 1.93 had the standard size distribution shown in Table F below. The descriptor nomenclature D5, D25, D50, D75, and D95 means that the diameter with the bead size distribution containing 5, 25, 50, 75 and 95% of the bead diameter within the sample is less than or equal that value.

TABLE F

Microsphere Size Distribution for Example 1

| Descriptor | Size (micrometers) |
| --- | --- |
| D5 | 67 |
| D25 | 72 |
| D50 | 74 |
| D75 | 80 |
| D95 | 84 |

Example 2

A retroreflective film sample was prepared using the general procedure described above. The transparent microspheres in the form of glass beads with refractive index 1.93 had the standard size distribution shown in Table G below. The descriptor nomenclature D5, D25, D50, D75, and D95 means that the diameter with the bead size distribution containing 5, 25, 50, 75 and 95% of the bead diameter within the sample is less than or equal that value.

TABLE G

Microsphere Size Distribution for Example 2

| Descriptor | Size (micrometers) |
|---|---|
| D5 | 80 |
| D25 | 86 |
| D50 | 90 |
| D75 | 96 |
| D95 | 104 |

Example 3

A retroreflective film sample was prepared using the general procedure described above. The transparent microspheres in the form of glass beads with refractive index 1.93 had the standard size distribution shown in Table H below. The descriptor nomenclature D5, D25, D50, D75, and D95 means that the diameter with the bead size distribution containing 5, 25, 50, 75 and 95% of the bead diameter within the sample is less than or equal that value.

TABLE H

Microsphere Size Distribution for Example 3

| Descriptor | Size (micrometers) |
|---|---|
| D5 | 92 |
| D25 | 99 |
| D50 | 106 |
| D75 | 112 |
| D95 | 122 |

The retroreflectivity and color data were measured using the Test Methods described above. The data are shown in Table 1. In general, a larger bead diameter allowed for a thicker colored polymer layer between the beads and therefore, an improved color luminance Y. However, it was unexpected and surprising that Example 1, having a lower median bead diameter but tighter size distribution, showed an improved combination of retroreflectivity and color luminance than Comparative Example C2. This is in contrast to other teachings in the art, for example the Nilsen and Lu article from 2004, (*Retroreflection Technology*, Robert B. Nilsen, Xai Jing Lu., Proc. of SPIE Vol. 5616—Optics and Photonics for Counterterrorism and Crime Fighting, 47, Dec. 16, 2004), that suggests that in order to increase the retroreflective efficiency and obtain good near and far field performance, small beads are inlaid with large beads.

Further improvement in both color and retroreflectivity can be seen in Example 2. In this example, the bead size distribution is narrower than Comparative Examples C1 and C2 and the median bead diameter is larger than Example 1. The retroreflective coefficients for different combination of observation and entrance angles for Example 2 is shown as Table 2. Example 2 provides a good color luminance with high level of retroreflectivity across the entire required range required in high visibility (Level 2) safety standards.

In Example 3 the median bead size is larger than Examples 1 and 2. The resultant Y and $R_A$ at 0.2° observation and +5° entrance angle are significantly higher. However, as shown in Table 3, the larger bead diameter results in decreased retroreflective efficiency at higher observation angles.

TABLE 1

| Example | $R_A$ (cd/lx-m$^2$) | Y | x | y |
|---|---|---|---|---|
| Comparative Example C1) | 299 | 76.0 | 0.3924 | 0.5418 |
| Comparative Example C2) | 442 | 76.2 | 0.3897 | 0.5407 |
| Example 1 | 471 | 81.9 | 0.3914 | 0.5416 |
| Example 2 | 484 | 85.3 | 0.3943 | 0.5427 |
| Example 3 | 490 | 90.1 | 0.3959 | 0.5412 |

TABLE 2

Retroreflective Coefficients for Example 2

| Observation Angle (degrees) | Entrance Angle (degrees) | $R_A$ (cd/lux/m$^2$) | Spec (cd/lux/m$^2$) | Delta $R_A$ – Spec (cd/lux/m$^2$) |
|---|---|---|---|---|
| 0.2 | 5 | 506.0 | 330 | 176.0 |
| 0.2 | 20 | 586.4 | 290 | 296.4 |
| 0.2 | 30 | 451.1 | 180 | 271.1 |
| 0.2 | 40 | 216.0 | 65 | 151.0 |
| 0.33 | 5 | 281.3 | 250 | 31.3 |
| 0.33 | 20 | 314.8 | 200 | 114.8 |
| 0.33 | 30 | 285.3 | 170 | 115.3 |
| 0.33 | 40 | 161.8 | 60 | 101.8 |
| 1 | 5 | 48.2 | 25 | 23.2 |
| 1 | 20 | 46.5 | 15 | 31.5 |
| 1 | 30 | 36.7 | 12 | 24.7 |
| 1 | 40 | 19.0 | 10 | 9.0 |
| 1.5 | 5 | 14.1 | 10 | 4.1 |
| 1.5 | 20 | 11.8 | 7 | 4.8 |
| 1.5 | 30 | 11.8 | 5 | 6.8 |
| 1.5 | 40 | 8.5 | 4 | 4.5 |

TABLE 3

Retroreflective Coefficients for Example 3

| Observation Angle (degrees) | Entrance Angle (degrees) | $R_A$ (cd/lux/m$^2$) | Spec (cd/lux/m$^2$) | Delta $R_A$ – Spec (cd/lux/m$^2$) |
|---|---|---|---|---|
| 0.2 | 5 | 543.8 | 330 | 213.8 |
| 0.2 | 20 | 338.1 | 290 | 48.1 |
| 0.2 | 30 | 180.7 | 180 | 0.7 |
| 0.2 | 40 | 90.7 | 65 | 25.7 |
| 0.33 | 5 | 218.1 | 250 | -31.9 |
| 0.33 | 20 | 170.9 | 200 | -29.1 |
| 0.33 | 30 | 111.0 | 170 | -59.0 |
| 0.33 | 40 | 70.2 | 60 | 10.2 |
| 1 | 5 | 45.6 | 25 | 20.6 |
| 1 | 20 | 34.5 | 15 | 19.5 |
| 1 | 30 | 10.3 | 12 | -1.7 |
| 1 | 40 | 9.4 | 10 | -0.6 |
| 1.5 | 5 | 15.9 | 10 | 5.9 |
| 1.5 | 20 | 11.8 | 7 | 4.8 |
| 1.5 | 30 | 7.2 | 5 | 2.2 |
| 1.5 | 40 | 1.9 | 4 | -2.1 |

Modeling Studies

A series of modeling studies were run to show that the combination of color and retroreflectivity can be further enhanced by changing the refractive index of the transparent microsphere and increasing the color thickness to increase the amount of colored polymer layer between the transparent microspheres. The optical model used a ray trace algorithm to calculate the light path from a collimated external source through an exposed bead (i.e. refraction at the air/bead interface) and multiple refraction events at the polymer layer/bead interface, and reflection on a reflective layer that is conformal to the bead and polymer layer. The amount of returned light was calculated as a function of divergence angle (equivalent to observation angle in retroreflection measurement nomenclature). The relative amount of returned light within a specified divergence angle range was used to calculate a relative bead retroreflective efficiency. This relative efficiency coefficient was then used to provide comparisons of various combinations of bead size, bead refractive index and polymer layer thickness. The results are shown in FIGS. 4 and 5.

FIGS. 4 and 5 show the effect on retroreflective efficiency as a function of colored polymer layer thickness/bead diameter for different bead refractive indices for beam divergence (observation angle) ranges of 0.5 and 1.6 degrees. The typical optimal bead index for air interface in what are commonly referred to as exposed bead structures, as taught, for example, in U.S. Pat. No. 3,700,305 (Bingham) is approximately 1.93, and it was unexpected that at a change in the refractive index would cause a dramatic shift in the optimal thickness of the colored polymer layer and provide an opportunity for increasing the amount of colorant between and behind the transparent microspheres without degrading the retroreflective efficiency.

What is claimed is:

1. A retroreflective article comprising:
   a layer of optical elements, embedded in a bead bond layer, the optical elements comprising:
   transparent microspheres;
   at least one polymeric layer covering at least the portion of the transparent microsphere embedded in the bead bond layer; and
   at least one reflective layer covering at least a portion of the polymeric layer covering at least the portion of the transparent microsphere embedded in the bead bond layer, wherein the polymeric layer covering at least the portion of the transparent microsphere embedded in the bead bond layer comprises a multi-layer coating, wherein at least one of the layers of the multi-layer coating comprises a polymeric layer comprising at least one additive selected from UV stabilizers, antioxidants, UV absorbers, property modifiers, performance enhancers, or combinations thereof, wherein the polymeric layer comprising at least one additive selected from UV stabilizers, antioxidants, UV absorbers, property modifiers, performance enhancers, or combinations thereof is located between the surface of the transparent microsphere and a polymeric layer colored with at least one nanopigment, and wherein the transparent microspheres have a diameter range of 80-120 micrometers, with at least 75% of the transparent microspheres having a diameter range of 85-105 micrometers, and a refractive index in the range of 1.50-2.00.

2. The retroreflective article of claim 1, wherein transparent microspheres have a refractive index in the range of 1.80-1.95.

3. The retroreflective article of claim 1, wherein polymeric layer covering at least the portion of the transparent microsphere embedded in the bead bond layer has a thickness in the range of 1-20 micrometers.

4. The retroreflective article of claim 1, wherein the transparent microspheres have a refractive index of from 1.90-1.95 and the polymeric layer covering at least the portion of the transparent microsphere embedded in the bead bond layer has a thickness of from 1-5 micrometers, or the transparent microspheres have a refractive index of from 1.80-1.90 and the polymeric layer covering at least the portion of the transparent microsphere embedded in the bead bond layer has a thickness of from 5-15 micrometers.

5. The retroreflective article of claim 1, wherein the multi-layer coating comprises a polymeric layer colored with at least one nanopigment covering at least the portion of the transparent microsphere embedded in the bead bond layer, and a clear polymeric layer at least partially covering the polymeric layer colored with at least one nanopigment.

6. The retroreflective article of claim 1, wherein the polymeric layer comprises at least one fluorescent nanopigment.

7. The retroreflective article of claim 1, wherein the reflective layer comprises a layer of reflective metal or a reflective dielectric mirror.

8. The retroreflective article of claim 7, wherein the reflective layer comprises a layer of reflective metal selected from aluminum, silver, or a combination thereof.

9. The retroreflective article of claim 7, wherein the reflective layer comprises a layer of silver.

10. The retroreflective article of claim 7, wherein the reflective dielectric mirror layer comprises a multilayer construction.

11. The retroreflective article of claim 1, wherein the optical elements, embedded in a bead bond layer are embedded such that less than 50% of the surface area of the optical element is exposed.

12. The retroreflective article of claim 1, wherein at least a portion of the layer of optical elements is discontinuous.

13. The retroreflective article of claim 12, wherein the discontinuous portion of the layer of optical elements is formed by removing optical elements and bead bond layer.

14. An article of clothing comprising:
   a fabric with a first major surface and a second major surface; and
   a retroreflective appliqué attached to the first major surface of the fabric, the retroreflective appliqué comprising:
   a layer of optical elements, embedded in a bead bond layer, the optical elements comprising:
   transparent microspheres;
   at least one polymeric layer covering at least the portion of the transparent microsphere embedded in the bead bond layer; and
   at least one reflective layer covering at least a portion of the polymeric layer covering at least the portion of the transparent microsphere embedded in the bead bond layer, wherein the polymeric layer covering at least the portion of the transparent microsphere embedded in the bead bond layer comprises a multi-layer coating, wherein at least one of the layers of the multi-layer coating comprises a polymeric layer comprising at least one additive selected from UV stabilizers, antioxidants, UV absorbers, property modifiers, performance enhancers, or combinations thereof, wherein the polymeric layer comprising at least one additive selected from UV stabilizers, antioxidants, UV absorbers, property modifiers, performance enhancers, or combinations thereof is located between the surface of the transparent microsphere and a polymeric layer colored with at least one nanopigment, and wherein the transparent microspheres have a diameter range of 80-120 micrometers, with at least 75% of the transparent microspheres having a diameter range of 85-105 micrometers, and a refractive index in the range of 1.50-2.00.

15. A method of preparing a retroreflective article comprising:
- providing a polymeric carrier layer with a first major surface and a second major surface;
- providing transparent microspheres, wherein the transparent microspheres have a diameter range of 80-120 micrometers, with at least 75% of the transparent microspheres having a diameter range of 85-105 micrometers, and a refractive index in the range of 1.50-2.00;
- partially embedding the transparent microspheres into the first major surface of the polymeric carrier layer such that the beads at least partially protrude from the first major surface of the polymeric carrier layer to form a layer of microspheres;
- depositing a first polymeric layer on at least a portion of the first major surface of the polymeric carrier layer and the layer of microspheres, wherein the first polymeric layer comprises a multi-layer coating, wherein at least one of the layers of the multi-layer coating comprises a polymeric layer comprising at least one additive selected from UV stabilizers, antioxidants, UV absorbers, property modifiers, performance enhancers, or combinations thereof, wherein the polymeric layer comprising at least one additive selected from UV stabilizers, antioxidants, UV absorbers, property modifiers, performance enhancers, or combinations thereof is located between the surface of the transparent microsphere and a polymeric layer colored with at least one nanopigment;
- depositing a reflective layer on at least a portion of the first polymeric layer;
- applying a bead bond layer to the layer of microspheres; and
- removing the polymeric carrier layer.

16. The method of claim 15, wherein the polymeric carrier layer comprises a thermoplastic polymeric carrier layer.

17. The method of claim 15, wherein depositing the reflective layer on at least a portion of the first major surface of the polymeric carrier layer and the layer of microspheres comprises depositing a layer of dielectric material or the depositing of a reflective metal layer to the layer of microspheres.

18. The method of claim 17, wherein depositing the reflective layer on at least a portion of the first major surface of the polymeric carrier layer and the layer of microspheres comprises depositing a layer of silver.

19. The method of claim 17, wherein depositing the reflective layer on at least a portion of the first major surface of the polymeric carrier layer and the layer of microspheres comprises depositing a multilayer dielectric material coating.

20. The method of claim 15, wherein partially embedding the transparent microspheres into the first major surface of the polymeric carrier layer comprises embedding the transparent microspheres such that less than 50% of the surface area of the microsphere is exposed.

* * * * *

UNITED STATES PATENT AND TRADEMARK OFFICE
CERTIFICATE OF CORRECTION

PATENT NO. : 10,281,623 B2
APPLICATION NO. : 15/113088
DATED : May 7, 2019
INVENTOR(S) : McCoy et al.

It is certified that error appears in the above-identified patent and that said Letters Patent is hereby corrected as shown below:

Column 11
Line 14, Delete "$n_1>n_1<n_3$" and insert -- $n_2>n_1<n_3$ --, therefor.

Column 17
Line 32, Delete "compostion." and insert -- composition. --, therefor.

Signed and Sealed this
Twelfth Day of May, 2020

Andrei Iancu
*Director of the United States Patent and Trademark Office*